US008485508B1

(12) United States Patent
Newman et al.

(10) Patent No.: US 8,485,508 B1
(45) Date of Patent: Jul. 16, 2013

(54) MECHANICALLY OPERATED HAND-HELD FORCIBLE ENTRY DEVICE

(76) Inventors: Philip Newman, Boca Raton, FL (US); Richard Thaw, Boca Raton, FL (US)

( * ) Notice: Subject to any disclaimer, the term of this patent is extended or adjusted under 35 U.S.C. 154(b) by 654 days.

(21) Appl. No.: 12/786,630

(22) Filed: May 25, 2010

Related U.S. Application Data

(60) Provisional application No. 61/181,537, filed on May 27, 2009.

(51) Int. Cl.
*B23Q 3/06* (2006.01)

(52) U.S. Cl.
USPC ............ 269/151; 254/419; 254/103; 254/100

(58) Field of Classification Search
USPC .................. 269/151; 254/100, 103, 7 B, 7 R, 254/2 R, 134, 2 B
See application file for complete search history.

(56) References Cited

U.S. PATENT DOCUMENTS

| | | | | | |
|---|---|---|---|---|---|
| 3,904,177 | A | * | 9/1975 | Dalton | 254/103 |
| 4,896,862 | A | | 1/1990 | Ganley | |
| 4,996,862 | A | | 3/1991 | Schrors | |
| 5,855,360 | A | * | 1/1999 | Wurdack | 254/100 |
| 7,152,848 | B2 | * | 12/2006 | Pfleging et al. | 254/419 |

* cited by examiner

*Primary Examiner* — Monica Carter
*Assistant Examiner* — Melanie Alexander
(74) *Attorney, Agent, or Firm* — Gold & Rizvi, P.A.; H. John Rizvi

(57) ABSTRACT

A mechanical hand held door opener device, light in weight and operable in any orientation including being inverted, for generating substantial door-opening force with a minimum effort from a user. When the user rotates the handle, he or she activates the unit by moving the shaft that interlocks with the first and second bevel gears. Since the second gear is fastened to the central lead screw, its rotation causes the rotation of the screw. The rotation of the screw then advances or retracts, depending on the clockwise or anti-clockwise rotation; and the inner platform and the four columns attached to the inner platform moves inwardly or outwardly of the outer platform.

20 Claims, 14 Drawing Sheets

MECHANICALLY OPERATED HAND-HELD FORCIBLE ENTRY DEVICE

CROSS REFERENCE TO RELATED APPLICATION

This application claims the benefit of co-pending U.S. Provisional Patent Application Ser. No. 61/181,537, filed on May 27, 2010, which is incorporated herein in its entirety.

BACKGROUND OF THE INVENTION

1. Field of the Invention

This invention relates generally to a mechanical hand held door opener device, light in weight and operable in any orientation, including inverted, for generating a substantial door-opening force with a minimum effort from the user. More particularly, this invention is referred to as a mechanically-operated hand-held forcible entry device, capable of providing a set of useful features for firefighters and law enforcement agents using a simple mechanical device.

2. Description of the Prior Art

Forcible entry is a technique used to gain access to a structure whose normal means of access is locked, blocked, or nonexistent.

There are several situations in which a forcible entry is required. Some of the most common are: rescue, escape, fire, preventing further property loss, accessing areas critical to pass through, etc. Every different forcible entry always involves forcing a door or a window for which different type of tools are used.

Depending on the physical structure and function, the tools used during a forcible entry may be classified as: striking tools, prying tools, hydraulic tools, lock pulling tools and cutting tools, among others.

Among the striking tools, the following may be named: flat-head axe, sledgehammer, battering rams, hammers, and duck-billed lock breaker.

The flat-head axe, whose primary use is for breaking down doors, comprises a chrome-plated or steel flat head with a wooden or plastic handle. Heavy enough for a short strike stroke on an iron or padlock breaker, its large oversized head makes the strike stroke zone more accurate and easy to hit. Its cutting edge is usually annealed to keep its edge longer.

A sledgehammer, comprising a large, flat head attached to a handle, can apply a great impulse due to its large size and distribute force over a wide area. This tool is commonly used by police forces in raids on property to gain entry by force, commonly through doors.

Battering rams, comprising a large heavy metal ram carried by two people and propelled with force against an obstacle, are commonly used by SWAT teams for opening locked doors and effecting a forced entry. Other modern battering rams include a cylinder in which a piston gets fired automatically upon impact, which enhances the momentum of the impact significantly.

Hammers are also used as a smaller version of sledgehammers, and they are especially useful for weak wooden doors or windows.

A duck-billed lock breaker is an all steel tapered head designed to be placed in the shackle of a padlock and when hit with a mallet or the back of an axe easily spreads the shackle open.

Regarding the prying tools we can mention: the Halligan bar, the adz bar and the pry bar.

The Halligan bar is a special tool commonly used in the fire and rescue service. The Halligan is a multipurpose prying tool consisting of a claw (or fork), a blade, and a pick, which is especially useful in quickly breaking through many types of locked doors. The fork end of the tool can be used to break in through an outward swinging door by forcing the tool between the door and door jamb and prying the two apart. Along with the K-tool and the adz or fork end a lock can easily be pulled. There are many other uses of the Halligan tool, including vehicle rescue and opening of walls. A Halligan bar and an axe can be joined together to form what is known as a married set, or set of irons.

The adz bar is a tool for all operations from forcible entry, to search and overhaul. This tool is a Halligan tool, except that an adz replaces the traditional fork on the end of the bar. The adz is gently curved and thin enough to penetrate those tight spaces during forcible entry operations.

The pry bar or more informally a jimmy bar, or gooseneck is a tool comprising a metal bar with a single curved end and flattened points, often with a small fissure on one or both ends. It is used as a lever to either force apart two objects or remove nails. A common use for larger crowbars is for prying apart boards, and generally smashing things. Crowbars can be used as any of the three lever classes but the curved end is usually used as a first-class lever, and the flat end as a 2nd class lever.

Among the hydraulic tools, the following examples can be mentioned: the Rabbit Tool, the Port-A-Power and other powered tools.

Commercially known as the rabbit tool, this is a one piece integrated hydraulic forcible entry tool comprising an 11 lb., 13-inch long unit for cutting locks, bars and locking devices. It has stainless steel jaws with a spreading force and cutting force of 8,000 lbs. and features ¼" teeth that allow for easy placement between a door and its jamb. Using the hand operated pump, the Rabbit can spread a door 4" in 20-30 seconds.

Commercially known as the Port-A-Power, this is a portable pump unit associated with a 10 T hydraulic ram capable of creating a huge slamming force against any type of entries.

Another powered tool known in the art comprises an airless hand held hydraulic pump unaffected by gravity that continuously maintains pressure on the fluid in a dynamic reservoir chamber to enable pumping into a dynamic pressure chamber for actuating a forcing rod irrespective of the orientation of the pump. A release valve permits fluid return from the pressure chamber into the reservoir chamber. The pump can be fitted with a tool such as a door forcer.

The manual tools described above are useful for helping the firefighters and law enforcement agents to open weak doors, which can be opened using a regular lever or slamming force, but they are useless for opening strong doors. Instead, the hydraulic devices mentioned above are useful for opening strong doors, however they present the following drawbacks:

Hydraulic units create major problems by usually blowing out O-ring seals. Major leaks of oil create a dangerous spreading of toxic chemicals to the environment as well as the emission of fumes into the air. Furthermore, an extreme explosive surge is also created when seals are blown under pressure;

Secondary cylinders and hoses are required;

Hydraulics cannot be inverted with usage;

In most cases the door is ruined after it is opened;

Because of the internal fluids used in its hydraulic circuit, it cannot operate under extreme weather conditions;

They require excessive regular maintenance when is not being used.

Pneumatic devices including an inner air pressurized container are another known solution in the market. These are similar to the hydraulic ones, with the following drawbacks:

Limited time use;

Require filtering of air;

Difficult to control the movement of components using air;

Pressurized gas being extremely dangerous for use in hot or cold environments;

Constant and heavy maintenance.

Heavy carrying accessory chargers.

Therefore, a reliable fully-mechanical forcible entry device capable of avoiding the above-mentioned problems with a simple, low-maintenance and economical structure is still desired.

SUMMARY OF THE INVENTION

This invention is directed to a mechanical hand held door opener device, light in weight and operable in any orientation, included inverted, for generating a substantial door-opening force with a minimum effort from the user. More specifically, the present invention provides for a mechanical hand-held forcible entry device including:

an aluminum outer tube having a general parallelepiped shape with at least one cylindrical lateral hole on one end thereof and first and second open ends, a couple of sealed ball bearings are fastened to the lateral walls of said outer tube concentric to said cylindrical lateral hole;

on said cylindrical lateral hole, and on said ball bearings, a short drive shaft is rotably mounted;

said shaft remains transversally located in said outer aluminum tube with respect to the longitudinal axis;

the outer end of said shaft is faceted and is capable of receiving an activating handle;

inside said tube, on said shaft, a first bevel gear and a shaft ball bearing are mounted;

said first bevel gear remains in position between said ball bearing and an annular abutment that is part of said shaft;

inside said aluminum outer tube at least two stationary shaft ball bearings are fastened to the inner wall of said tube;

on said two stationary shaft ball bearings a central helical specially designed lead screw is rotably mounted;

on one end of said screw, a second bevel gear is mounted, engaged to the above mentioned first bevel gear;

on said screw, an inner platform with internal matching thread is also mounted, capable of advancing or retracting inside said tube;

said platform moves on said screw guided by four attached internal columns whose axis's are parallel to said screw;

the end of said four columns is attached to an outer platform with a wedge-like foot attachment.

When the user rotates the handle, he/she activates the unit by moving the shaft that interlocks with the first and second bevel gears. Since the second gear is fastened to the central lead screw, its rotation creates also the rotation of said screw. The rotation of said screw advances or retracts (depending on the clockwise or anti-clockwise rotation of the handle); the inner platform and the four columns attached thereto moves inwardly or outwardly the outer platform.

This invention provides major advantages over current similar technologies. The following are just some of the benefits incorporated by the use of the present invention:

The unit is 100% mechanical, no hydraulics (oil) or pneumatics (air) involved;

No hoses necessary;

Unlimited shelf life;

No maintenance. All mechanical parts for longer life use;

Lighter in weight;

High impact resistant for very abusive environments and industries, including fire departments, military, police, the DEA, SWAT, FBI and CIA;

Specialized components that develop high thrust with light operational functions;

Thrust and compressive structure in excess of 13,000 psi, that is 8 times more thrust required to open the most difficult entry system;

Water resistant;

The unit is made of high-impact and heat treated materials specifically designed for use in harsh environments;

Various attachments can be installed for various operations and activities such as: pressure-breaking locks, opening locked doors (of all sorts), locking or wedging and jacking applications;

All the interior structured components and systems are achieved by non-standard components in order to be able to develop the thrust and force that this unit can perform. Each of these components is specifically designed to work with each other to achieve the desired output;

Within 'ANSI' standards;

Its environmentally friendly or 'green' as it is totally inert and mechanical, no oils or 'O' ring blow outs with the consequent spillage of toxic chemicals or fumes to the environment;

Compact and light design, less storage space necessary;

Shorter self contained;

Greater thrust than other units on the market;

It can be operated by only one person;

In most cases the door is not ruined after it is opened;

Any type of door system can be opened: solid core doors, metal doors, steel industrial doors, swing-in and swing-out doors, etc.

It has a high 'IZOD' impact rating;

The unit is manufactured and can be used as a 'user friendly' and one-man operational unit;

The unit is designed and can operate in extreme hot or cold environments, from −20° F. to +290° F.

In summary, the present invention is referred to as a mechanically-operated hand-held forcible entry device, comprising an outer tube with at least one lateral hole, to the lateral walls of said outer tube a couple of bearings are fastened, to said bearings a drive shaft is rotably mounted to which an activating handle is attached; inside said tube, on said shaft, a first gear and a shaft bearing are mounted; inside said aluminum outer tube at least two stationary shaft bearings are mounted; on said two stationary shaft bearings a central helical lead screw is rotably mounted; on one end of said screw a second gear is mounted, engaged to the above mentioned first gear; on said screw, an inner platform is also mounted, capable of moving on said screw guided by attached internal columns whose axis is parallel to said screw; the end of said four columns are attached to an outer platform with a wedge-like foot attachment.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

Figure 1:
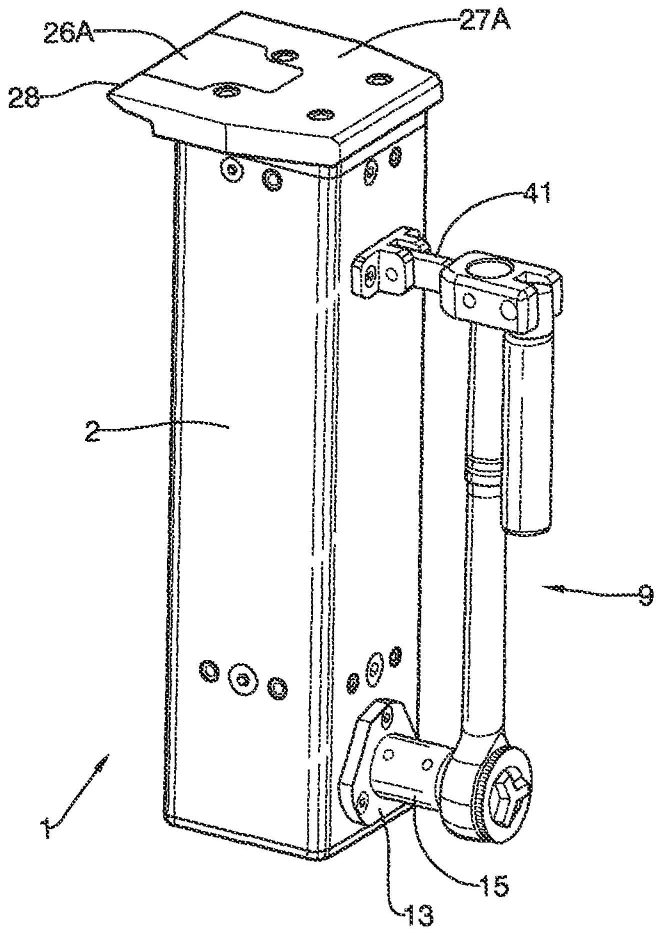
FIG. 1 is a general perspective view of the purposed hand held forcible entry device in accordance with the present invention, in an upright position with the handle in a locked position.
Figure 2:
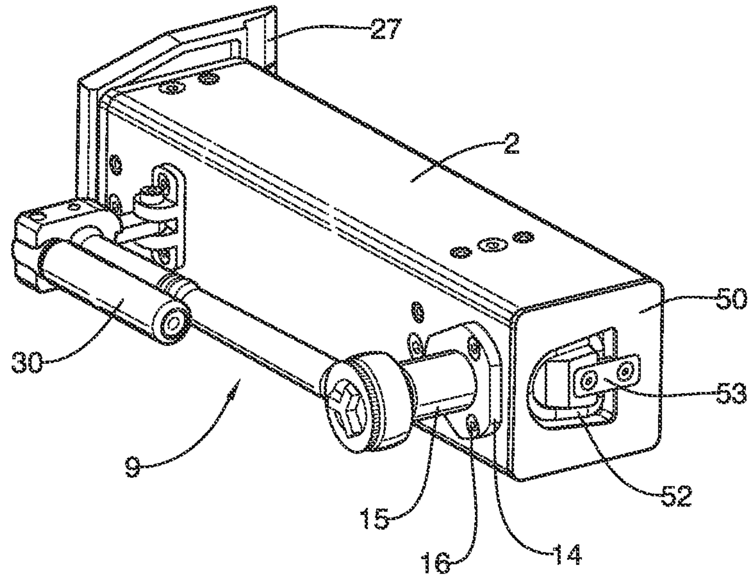
FIG. 2 is another general perspective view, similar to FIG. 1, but this time illustrating in detail the upper end thereof, and the carrying ring recessed into the face of the upper cap.
Figure 3:
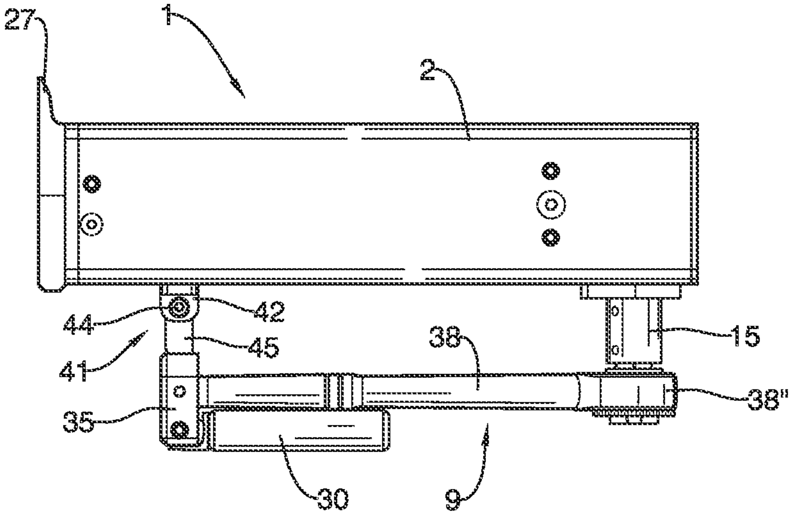
FIG. 3 is a side elevational view illustrating in detail the external aluminum main body and housing as well as the lateral handle with a ratchet mechanism.

Shown throughout the Figures, the invention is directed to a mechanically-operated hand-held forcible entry device 1, comprising aluminum 3"×3" main body and housing 2, having a general parallelepiped shape. This body 2 is made of aluminum heat sink material, which dissipates heat and is specifically designed for high temperature environment and areas of use in which this unit is normally used.

Said main body 2 defines a hollow tube with two end openings 4-5, and on one of the four walls thereof, next to said opening 3, said body 2 includes one lateral hole 3. The same body 2 includes several other holes for different bolts and screws for attaching different parts of the unit, as will be explained in detail below.

On the inner side of two face-to-face walls 2'-2" of said main body 2, corresponding to said hole 3, a couple of ball bearings 6-7 are fastened. Through said lateral hole 3, and on said ball bearings 6-7, a short drive shaft 8 is rotably mounted.

Figure 5:
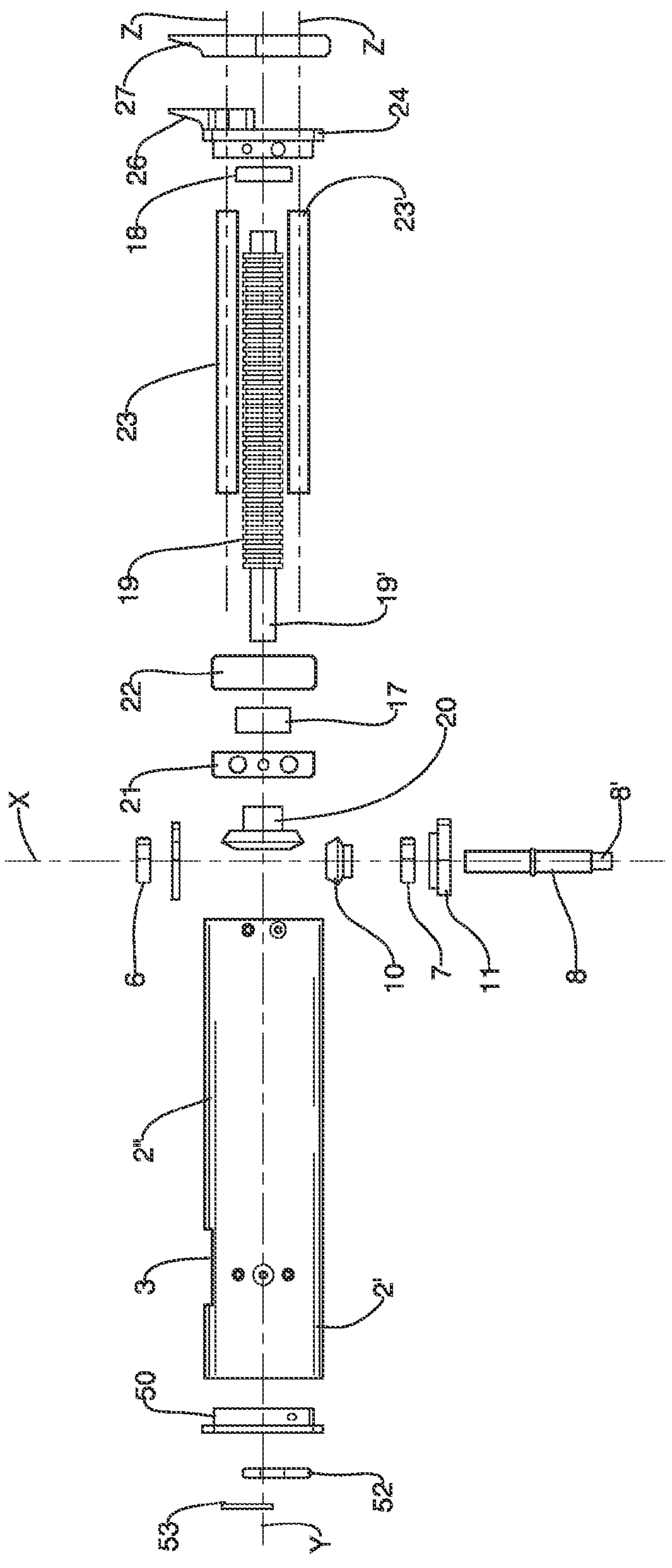
FIG. 5 is a schematically illustrated explosion of the purposed invention, illustrating the different inner parts thereon in a top plan view.
Figures 6A, 6B:
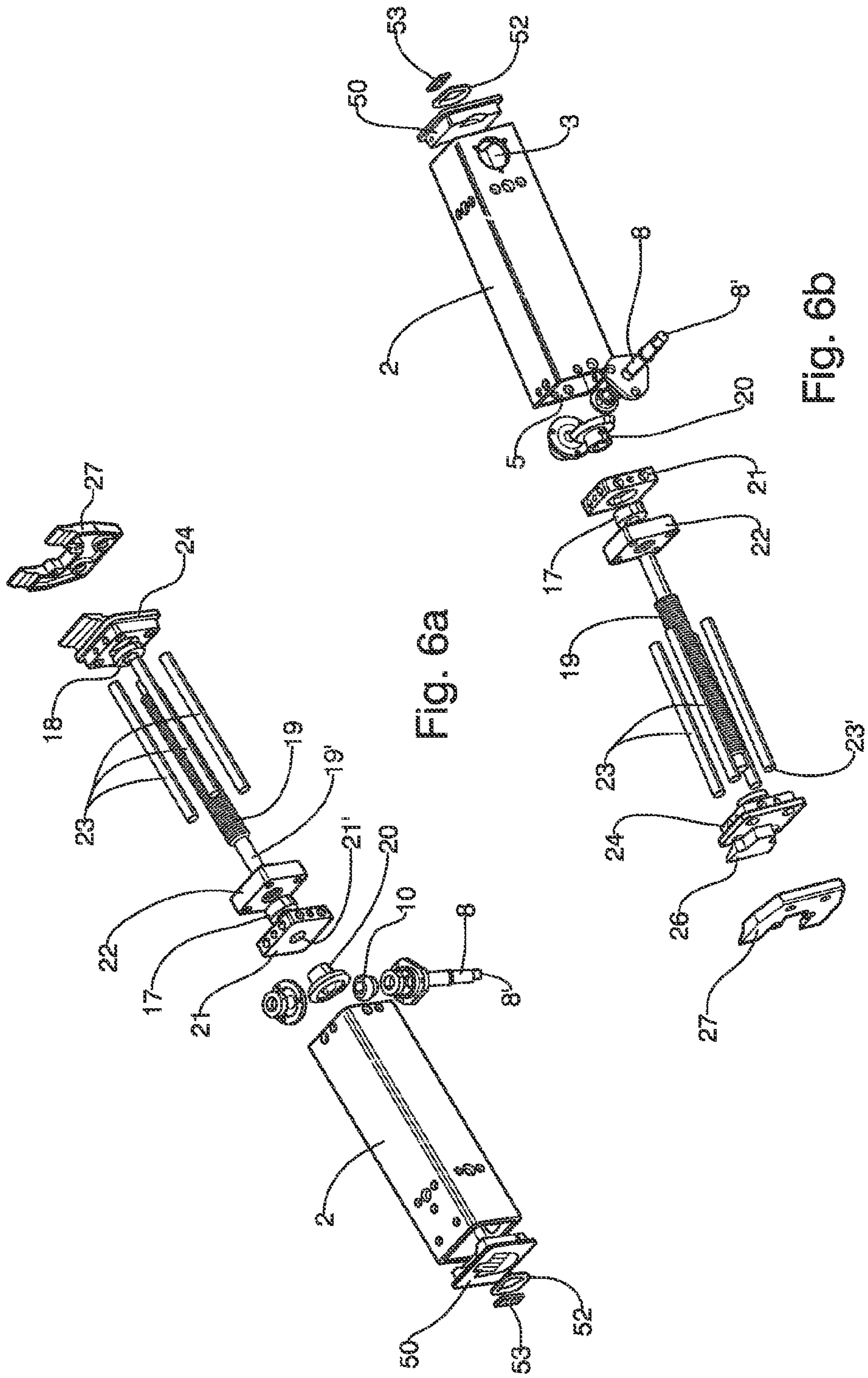
FIGS. 6A and 6B are different general perspective views of an explosion similar to FIG. 5, illustrating the inner parts of the present invention.
Figure 7:
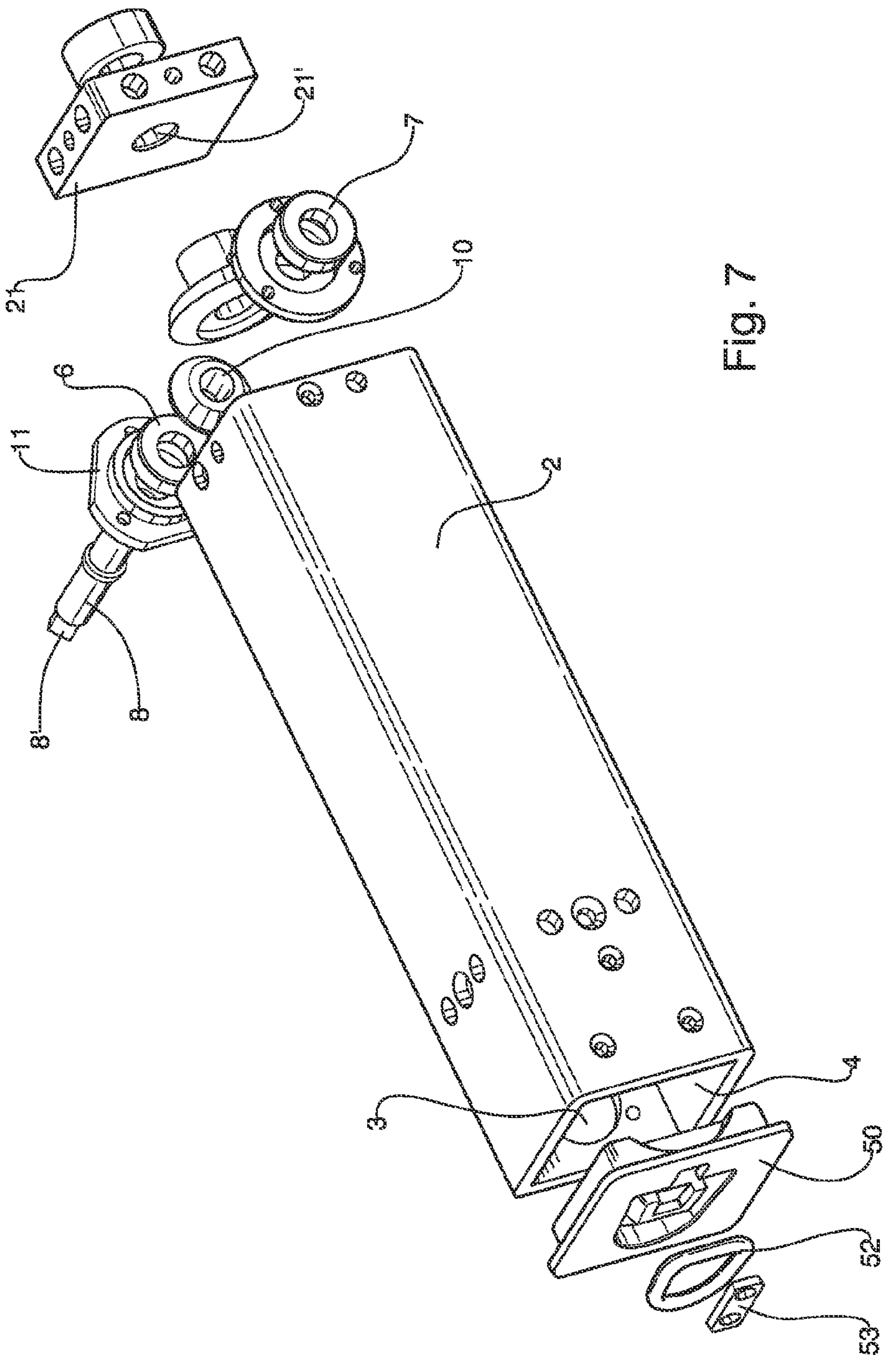
FIG. 7 is another general perspective view in partial explosion, illustrating in detail the upper cap with the carrying ring as well as the bevel gears.
Figure 8:
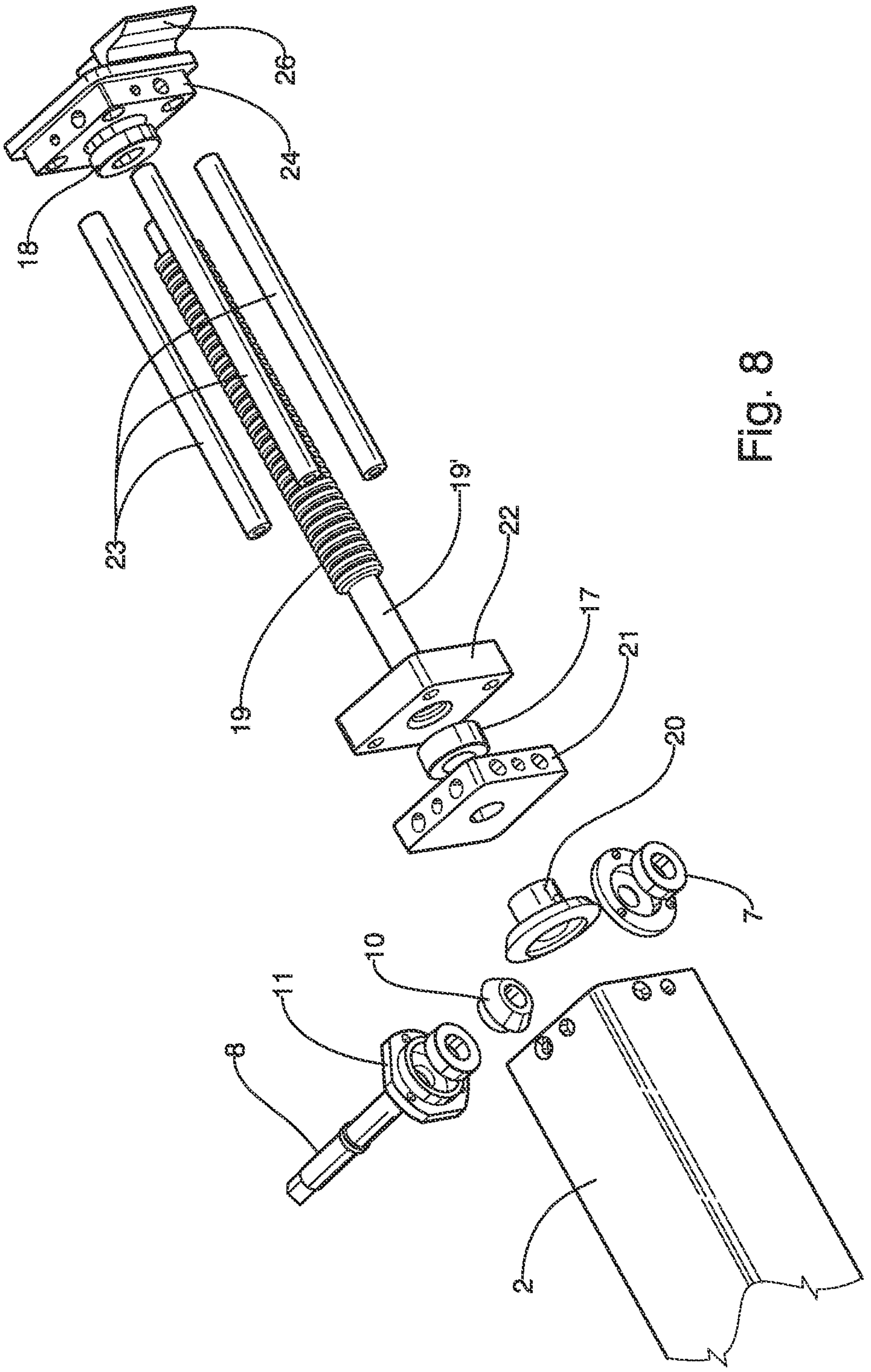
FIG. 8 is another general perspective view of the inner parts in partial explosion, this time showing in detail the bevel gears, the main driver screw, and the four wedge plate columns.

As it can be clearly seen in FIG. 5, said shaft 8 remains on a geometric axis X which is perpendicular to a geometric axis Y that is in turn the longitudinal axis of said main body and housing 2.

The outer end 8' of said shaft is faceted and capable of receiving an activating handle 9 as will be explained in detail below.

Inside said main body 2, and on said shaft 8, a first bevel gear 10 and a bearing cover plate 11 are mounted. Said first bevel gear 10 is attached to said shaft 8 which in turn rotates supported on said ball bearings 6-7 and the bearing cover plate 11.

To the outer face of said main body 2, and coincidentally with said hole 3, a shaft support 13 is screwed, comprising a base 14 from which the tip 8' of said shaft 8 is projected. Said support 13 is attached to the body 2 through screws 16 and defines a housing of the external end 8' of said shaft 8. To the tip 8' of said shaft 8 a cylindrical adapter 15 is mounted.

Inside said aluminum main body and housing 2 at least two shaft ball bearings 17-18 are mounted, and on which a central helical specially designed lead screw 19 is rotably mounted. On the tip 19' of said screw 19; a second bevel gear 20 is mounted, engaged to the above-mentioned first bevel gear 10. Next to said second bevel gear 20 and attached to the inner walls of said body 2, a stationary thrust platform 21 is mounted.

This platform 21 has a central hole 21' on which said lead screw 19 is mounted. On said screw 19 and between said bevel gear 20 and said ball bearing 18, a driver thrust platform 22 is mounted, with internal matching thread, and capable of advancing or retracting inside said tube, driving the columns, as will be explained below.

Said platform 22 is moved on said screw back and forward depending on the turning direction of said screw 19. The operating face 22' of said platform 22 includes four cylindrical recesses 12 on each of which four internal steel columns 23 are mounted, whose axis Z is parallel to axis Y of said screw 19 (see FIG. 5).

Figure 9:
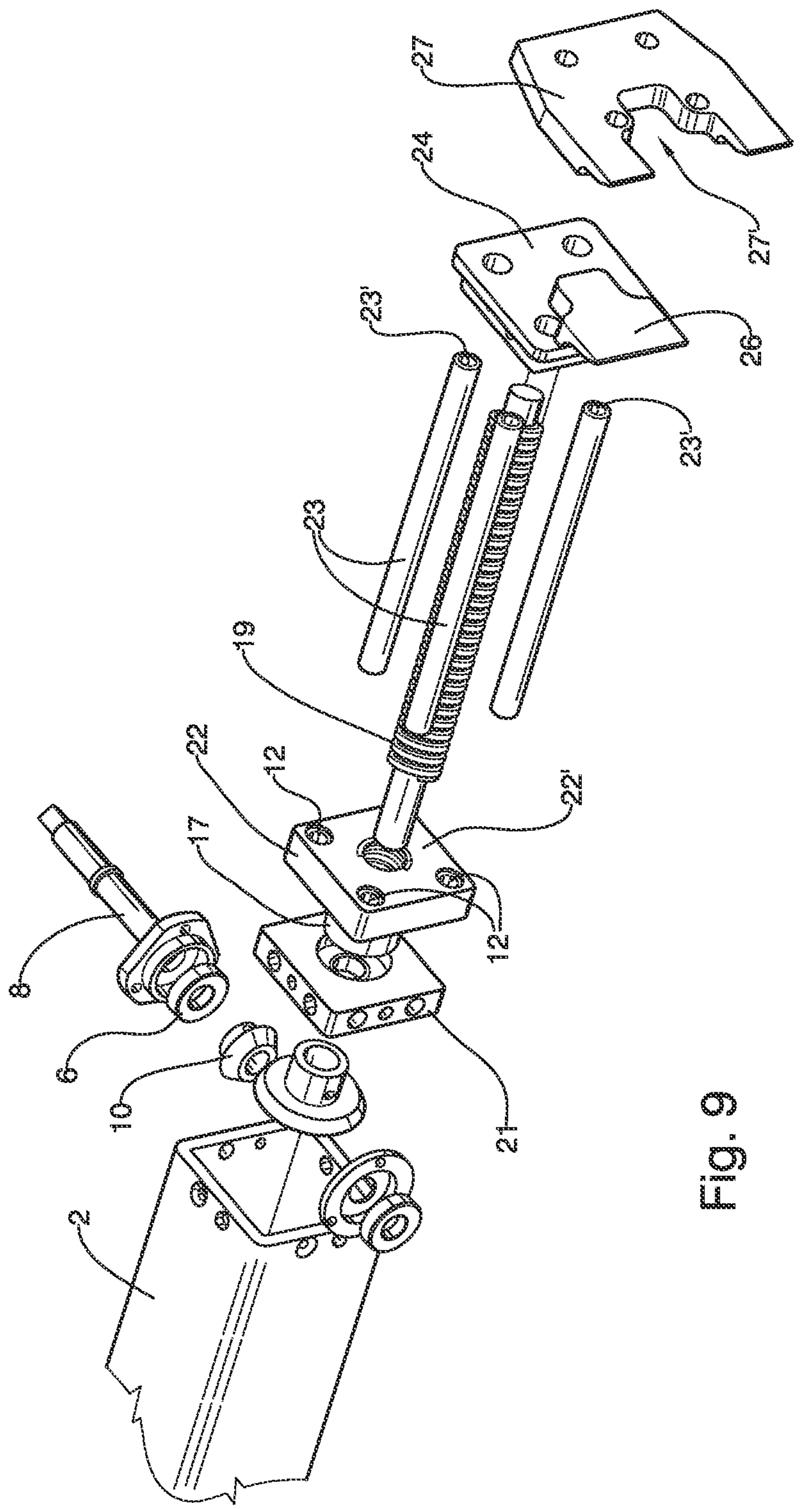
FIG. 9 is another general perspective view of the inner parts in partial explosion, similar to FIG. 8, showing in detail the driver threaded platform and the stationary thrust platform.
Figure 10:
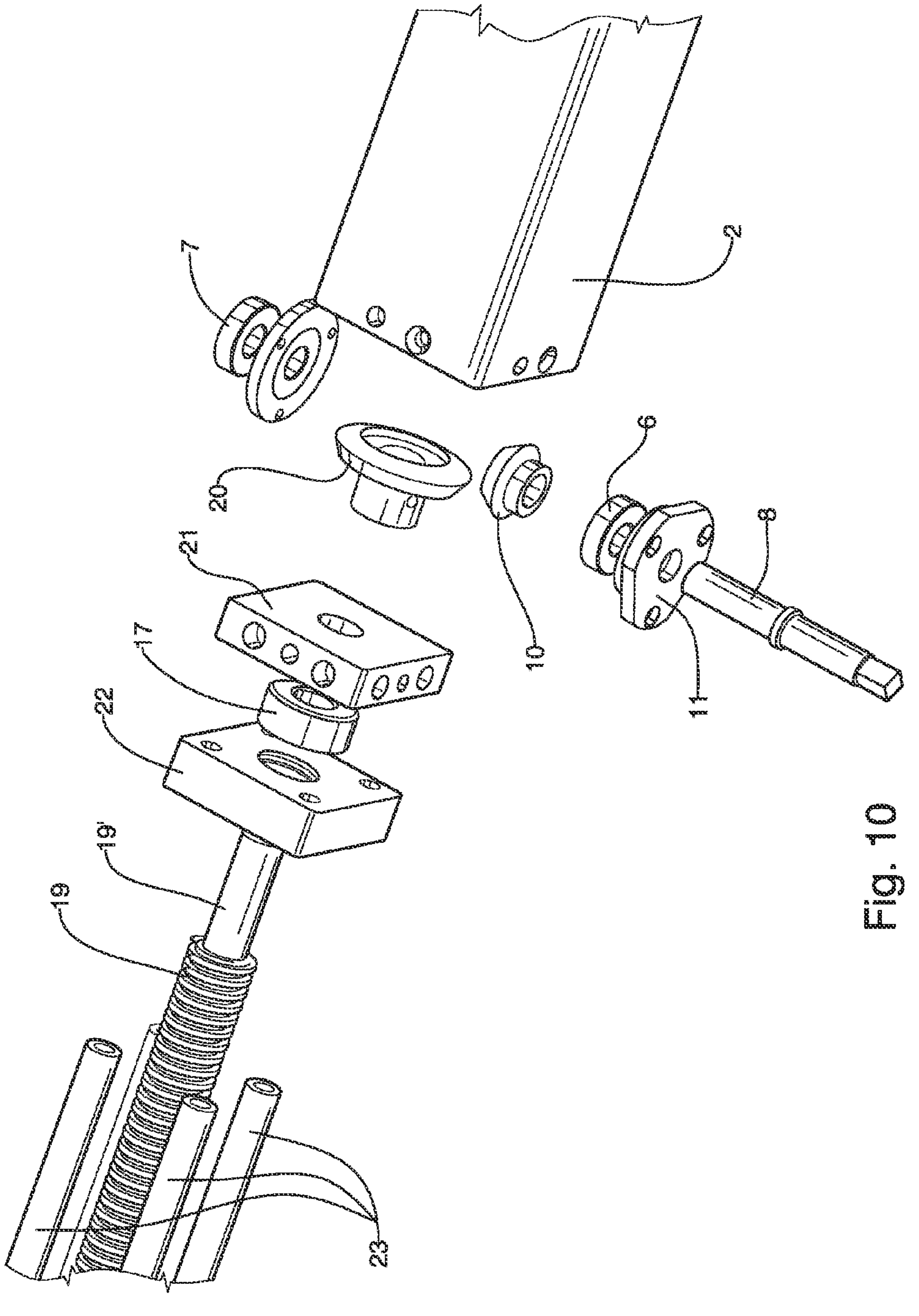
FIG. 10 is another general perspective view of the bevel gears, the driver threaded platform, the stationary thrust platform, and the main driver screw.
Figure 11:
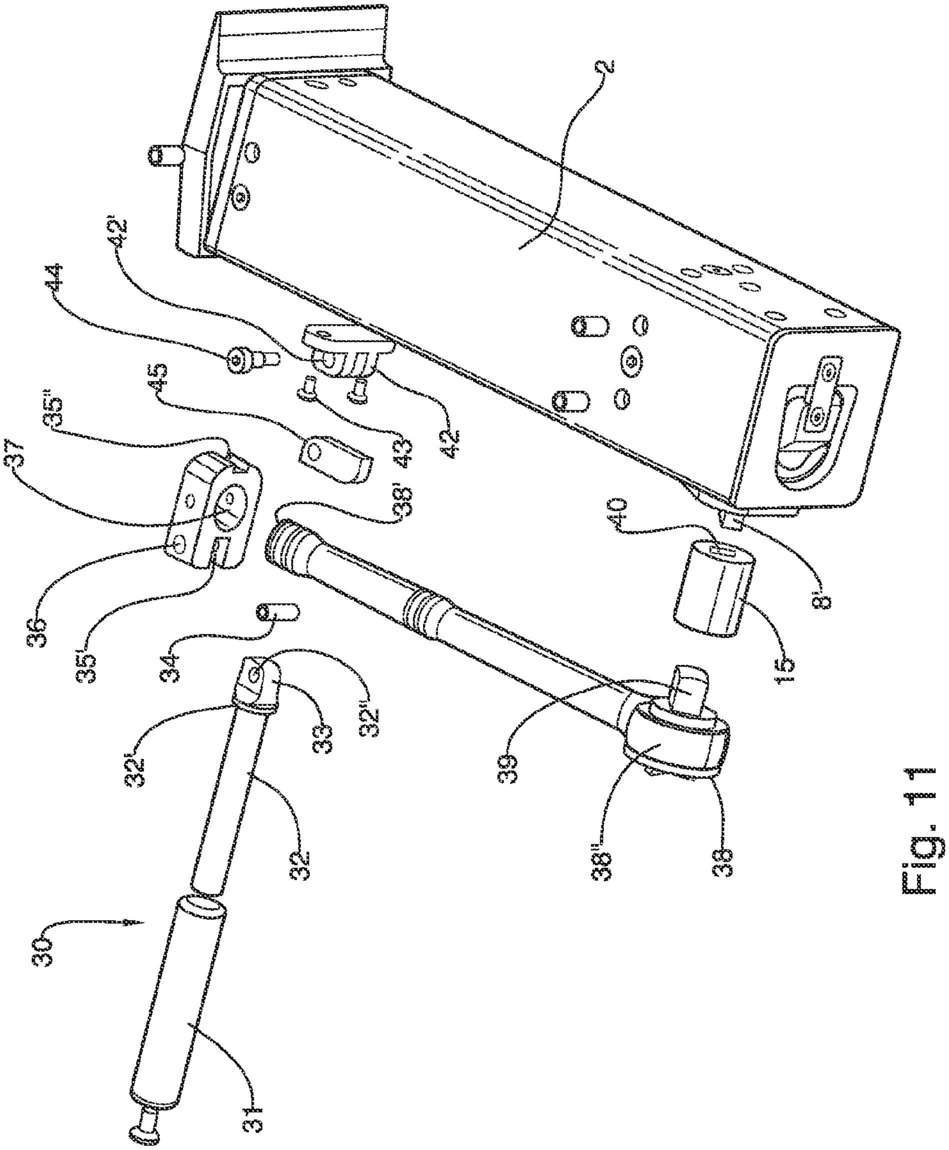
FIG. 11 is a general perspective view of the purposed unit showing the complete handle set in partial explosion.
Figure 12:
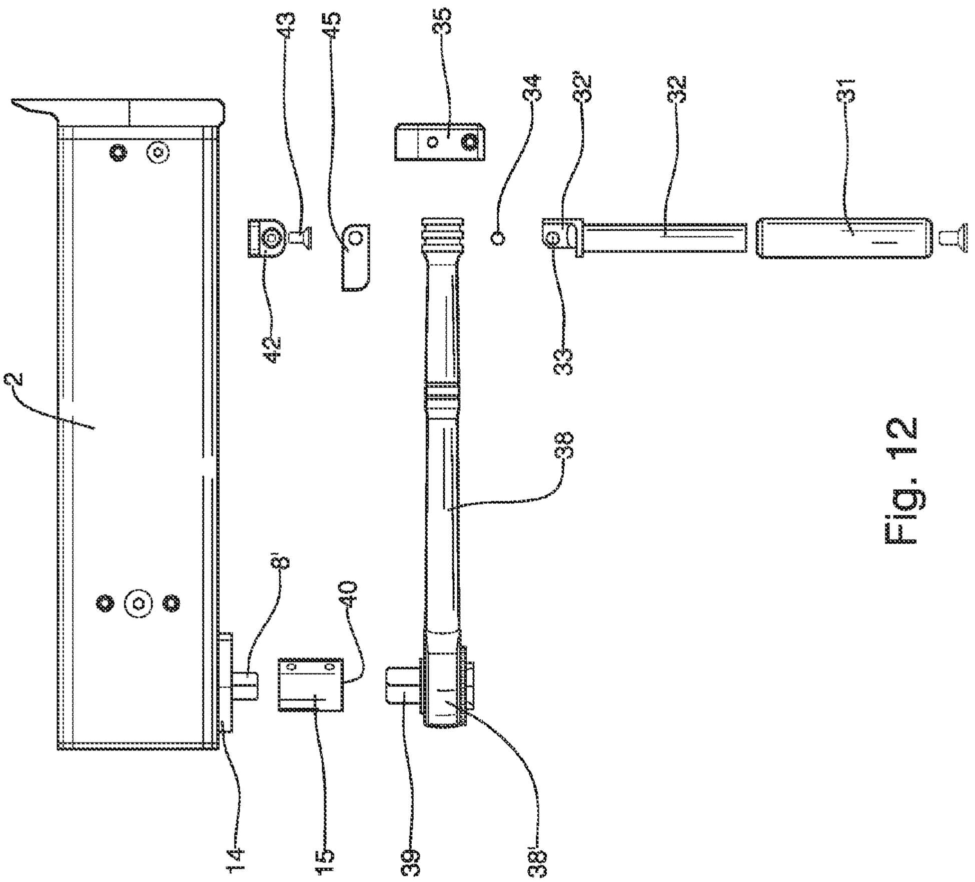
FIG. 12 is similar to FIG. 11, this time illustrating the parts in a top plan view.

The end 23' of said four columns 23 pass through holes 25 of a small wedge plate 24 and rest on four recesses 27' of a large wedge plate 27. Said wedge plate 24 includes a wedge-like foot attachment 26, that is complemented with the large wedge plate 27. As it can be clearly seen from FIG. 9, said large plate 27 includes an opening 27' which shapes coincides with the shape of said attachment 26. Therefore, when the unit is in its closed position, said attachment 26 is lodged in said opening 27' and both parts 24-26-27 define a single piece with an operating edge 28. Said operating edge 28 is inserted between the door and the door frame when the operator needs to force a door, as will be explained later.

The unit is complemented with a handle device 9 clearly illustrated in FIGS. 1-4, and 11-12. Said handle device 9 comprises an expandable telescopic handle 30 comprising an external cylindrical bar 31 and an internal cylindrical bar 32 that expands said handle 30 from 8" to 12" in length increasing the torque range 10 times greater. It can be used to open any type of door system. The external end 32' of said internal bar 32 is inserted into a U-shaped recess 35' of an intermediate piece 35. A pin 34 is inserted in an orifice 36, and passes through the orifice 32" of 32', allowing the rotation of said handle 30 regarding the ratchet 38.

Said intermediate piece 35 also includes a central recess 37 in which the end 38' of a ratchet 38 is inserted. This ratchet 38 is made of chrome-vanadium steel and can be operated as a crank in circular rotation using a unique 90° snap-out crank handle. This ratchet 38 is locked into place using a spring loaded ball lock, which thus becomes a carry handle as well as positioning the unit ready for operating. Using this crank handle increases the speed of opening doors as an operator can spin and crank the handle five times faster than using the ratchet all self-contained in a versatile unique handle.

Said ratchet 38 incorporates a flip-out design of 90° crank handle device. This allows for rapid operation and retraction of foot once extended.

Opposite end 38" of said ratchet 38 includes the internal ratchet mechanism itself, including a pawl, a ratchet wheel and a shaft. Said shaft includes a faceted external projection 39 which in turn is inserted in a complementary recess 40 of the cylindrical adapter piece 15.

When the unit is not in use, the above-described handle can be immobilized in order to make the unit more compact, avoid the involuntary movement of the ratchet and define a carrying handle. In the position illustrated in FIGS. 1-3 the handle is locked and is easy to realize that the handle, in this locked position, defines a secure an easy carrying handle for the operator. This immobilization can be obtained through a locking mechanism 41 comprising a hinge 42 screwed to the aluminum body 2 by screws 43. To the orifice 42' of said hinge 42 a locking bolt 45 is hinged using a barrel 44. The wedge-like shape of the outer end of said bolt 45 can be inserted in a slot 35". As it can be illustrated in FIG. 4B, said locking bolt 45 can be folded up when the unit is in use, to allow a free spin of the handle 9.

Figure 13:
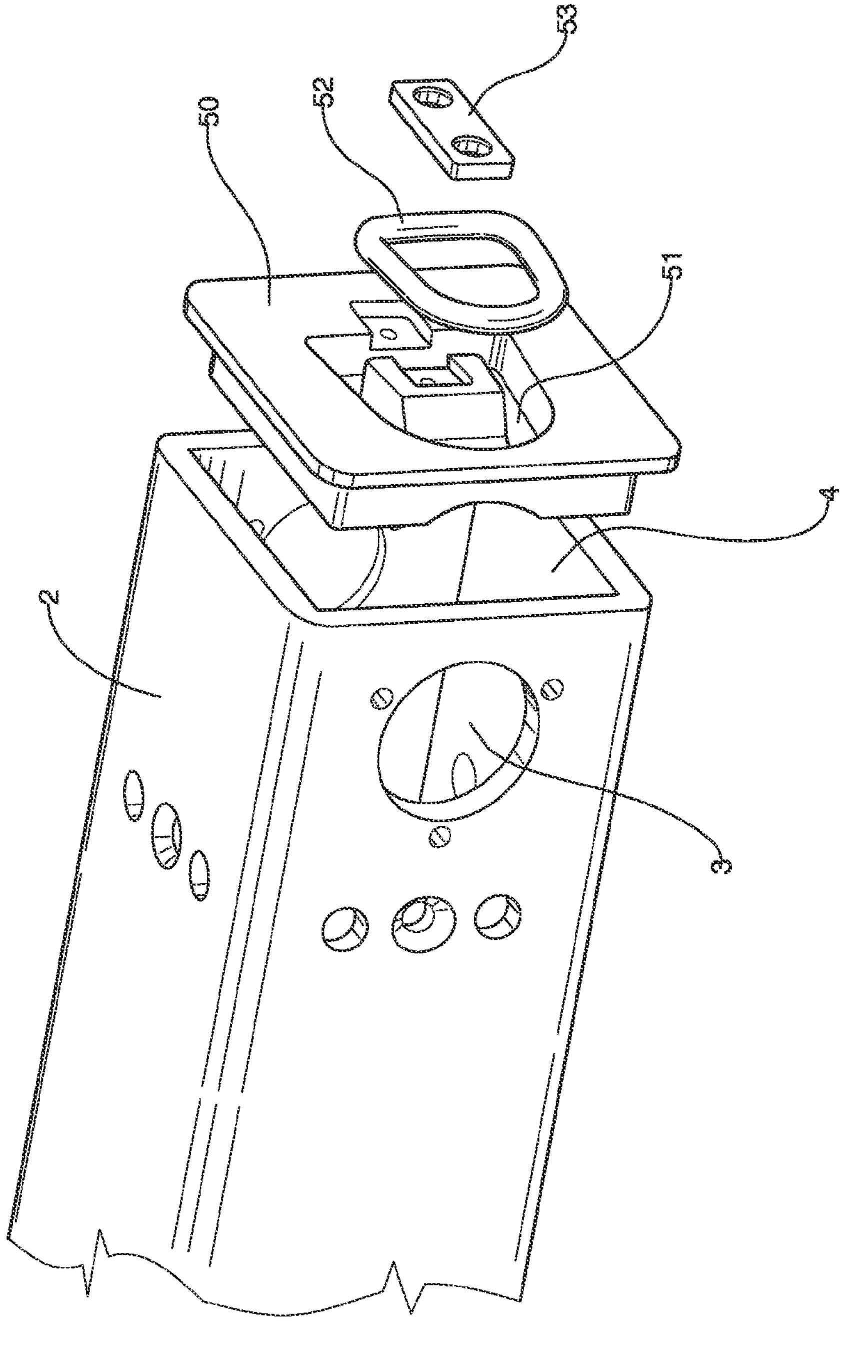
FIG. 13 is another perspective view showing in partial explosion the upper cap of the unit, the carrying ring and the ring holding device.
Figure 14:
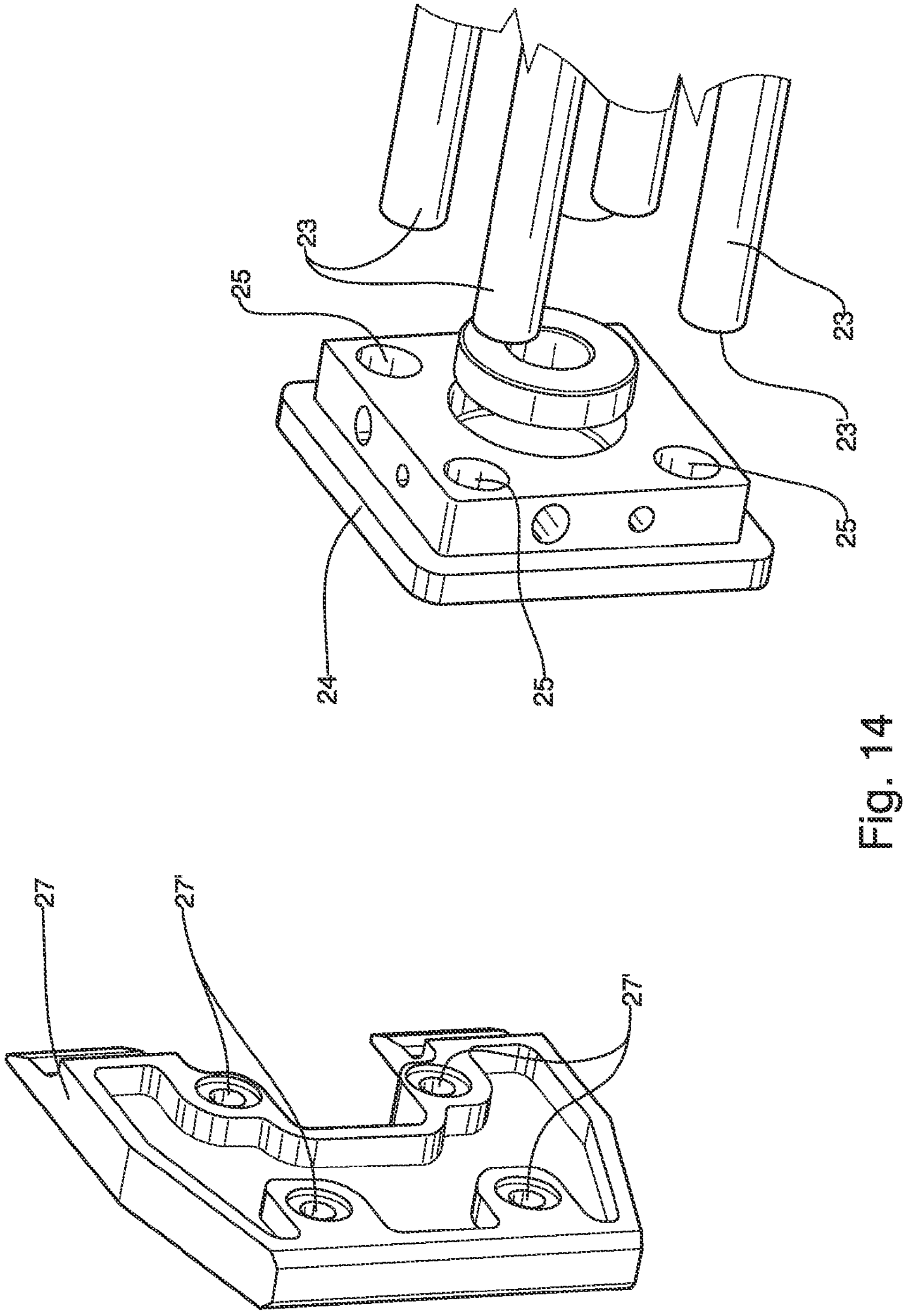
FIG. 14 shows in a perspective view the large wedge plate; finally.
Figure 15:
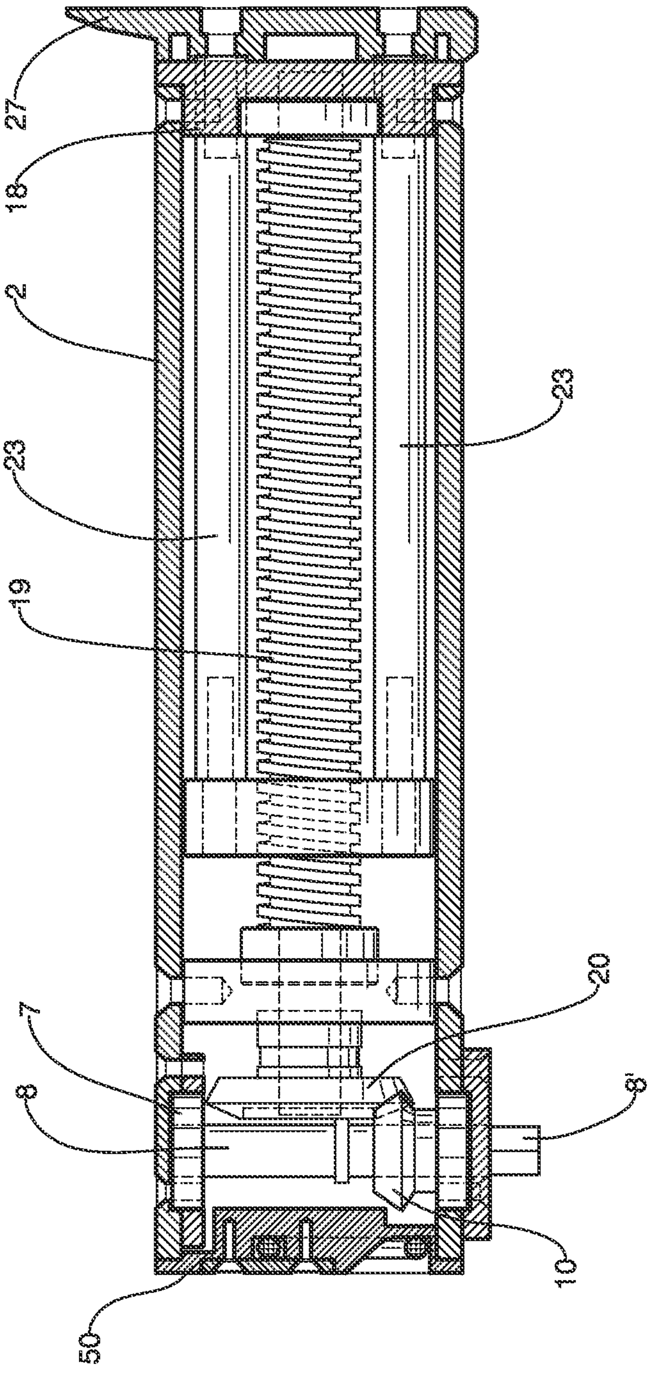
FIG. 15 is a longitudinal sectional view of the assembled unit.

As clearly illustrated in FIG. 13, opening 4 of said body 2 is closed by a top cover 50. Said cover includes a central external recess 51 in which a hook 52 is lodged. To keep the ring 52 back in place and insure safety when the unit is not in use, a retainer bar 53 is screwed to said cover 50.

Figure 4A:
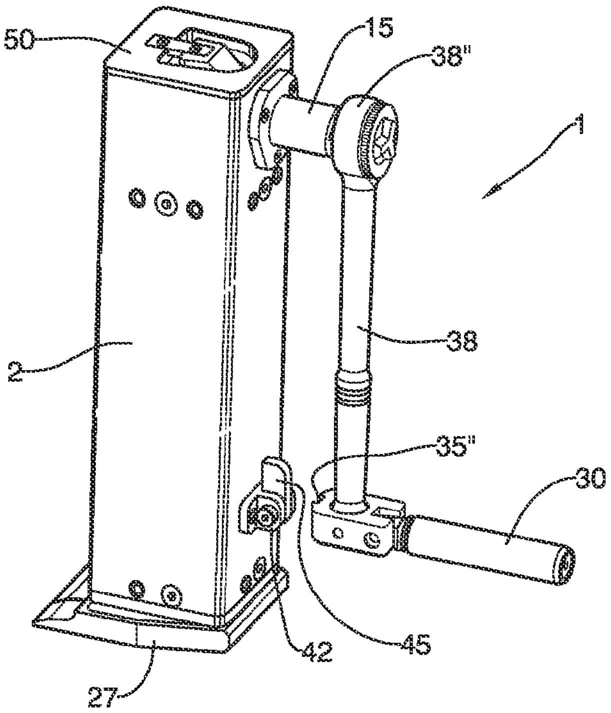
FIG. 4A is a general perspective view similar to FIG. 1 illustrating in detail the locking mechanism of the handle in its unlock position.
Figure 4B:
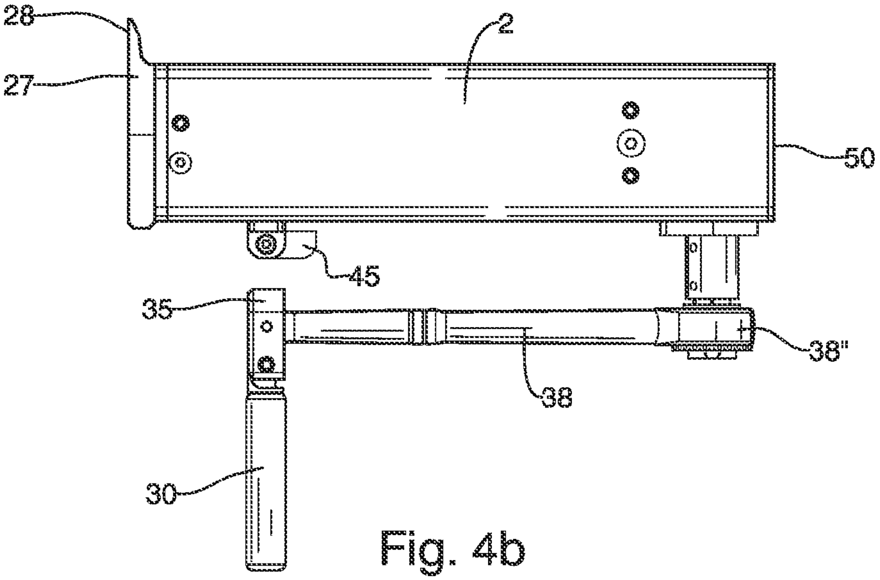
FIG. 4B is a side elevational view, illustrating the locking mechanism in its open position.

Before being able to use the unit 1, the user must unlock the handle, for which said bolt 45 must be rotated getting its tip out of the slot 35" (see FIG. 4A). Then the bar 30 is also rotated 90° up to its operating position (see FIG. 4B). Once the unit is in the position illustrated in FIGS. 4A and 4B, the user can rotate said handle 9 clockwise or counterclockwise. Rotation of bar 30 creates the rotation of ratchet 38, which projection 39 rotates the cylindrical adapter 15 and the later the tip 8' of said shaft 8.

Rotating said shaft 8 activates the unit by rotating first bevel gear 10 which in turn rotates second bevel gear 20. Since the second gear 20 is fastened to the central lead screw 19, its rotation creates also the rotation of said screw 19. Said screw rotates on its own axis, supported on ball bearings 17-18 and the stationary thrust platform 22.

Since the driver thrust platform 22 is screwed on said lead screw 19, the free rotation of said screw 19 forces a lineal movement of said platform 22 in said body 2. Thus, the rotation of said screw 19 advances or retracts (depending on the clockwise or anti-clockwise rotation of screw 19) the thrust platform 22, the four columns and the small wedge plate 24. For this purpose, the set defined by platform 22, four columns 23 and the small wedge plate 24 works as a pushing unit. In its non-operational position, the external face 26A of the wedge-like foot attachment 26 is coplanar with face 27A of the large wedge plate 27 (see FIG. 1).

When a firefighter or a law enforcement agent needs to forcible open a door, faces 27A-26A must be leaned on the external face of the door to be opened, inserting the operational edge 28 in the gap between the door and the door frame. Then, handle 9 is rotated creating a linear movement of 22-23-24 and both plates 24-27, creating a separation between each other. Since both pieces 26-27 are inserted in said door gap as a coplanar single piece, the separation between both plates creates a forcible entry force against the closed door.

The above mentioned bevel gears 10-20 and the central spiral screw 19 are specifically designed and manufactured having a much greater strength as well as having vibration of pitch surface creating a specific cone. There are non stranded tooth lines as well as variations of cross-sectional profiles, which projected from an actual three-dimensional shape of the gear teeth. This along with the specific angular gear pitch of both the cross sectional profile and specific tool line (curve) creates a unique smoothness of operation of the gears, with less wear and breakage. Major result factor is the creation of a smoother, stronger and more efficient gear action than others.

Moreover, the central spiral specialized lead screw has been designed having innovative variations from all standard known lead screws, that fall under ISO standards. This lead screw incorporates right hand clockwise operational rotation, a new thread angle developed with a new pitch. Angle and non ISO standard trapezoidal thread form developed, which is manufactured by single point form tool method. Thus the screw can carry much greater loads than similar looking units, as well as reducing ware on the mating internal nut adapter. Additionally internal thread diameters have been adjusted for male and female (non-standard) for decreasing weight and maintaining excessive strength.

The purposed forcible entry device can be manufactured in at least two different sizes, small or large, with a stroke or throw of zero to three inches in our smaller unit and a stroke of zero to seven inches for the larger model. Anyway, the stroke length or throw can be manufactured with any desired stroke proportionate to overall length.

The above described unique system of gears and components have been developed to function in unison for the specific intended purpose using a fully manual system having the ability to incorporate the drive mechanism to be activated by a DC battery system in place of the ratchet cranking system, without the use of pneumatics, hydraulics or any other liquefied or gas system.

Finally, the unit moving parts are coated with a specially designed lubricant to facilitate easy of operation, less required torque for operation and can operate in extreme environment conditions.

While the preferred embodiments of the invention have been described above, it will be recognized and understood that various modifications can be made in the invention and the appended claims are intended to cover all such modifications which may fall within the spirit and scope of the invention.

We claim:

1. A mechanically-operated hand-held forcible entry device, comprising body with at least one lateral hole, to lateral walls of said body a couple of bearings are fastened, to said bearings a drive shaft is rotably mounted to which an activating handle is attached; inside said body, on said shaft, a first gear and a bearing cover plate are mounted; inside said body at least two stationary shaft bearings are mounted; on said two stationary shaft bearings a central helical lead screw is rotably mounted; on one end of said screw a second gear is mounted, engaged to the above mentioned first gear; on said screw, a driver thrust platform is also mounted, capable of moving on said screw guided by attached internal columns whose axis is parallel to said screw; the end of said columns are attached to a small wedge plate with a wedge-like foot attachment.

2. The mechanically-operated hand-held forcible entry device of claim 1, wherein the body is made of aluminum.

3. The mechanically-operated hand-held forcible entry device of claim 1, wherein the lateral hole is cylindrical.

4. The mechanically-operated hand-held forcible entry device of claim 1, wherein the outer end of said shaft is faceted and is capable of receiving the activating handle.

5. The mechanically-operated hand-held forcible entry device of claim 1, wherein the driver thrust platform with internal matching thread is capable of advancing or retracting inside said body.

6. The mechanically-operated hand-held forcible entry device of claim 1, wherein the drive shaft rotably mounted to said ball bearings remains transversally located in said body with respect to the longitudinal axis.

7. The mechanically-operated hand-held forcible entry device of claim 1, wherein the driver thrust platform has an internal matching thread.

8. The mechanically-operated hand-held forcible entry device of claim 1, wherein the foot attachment has a wedge-like shape.

9. The mechanically-operated hand-held forcible entry device of claim 1, wherein said first and second gears are bevel gears.

10. The mechanically-operated hand-held forcible entry device of claim 1, wherein to an outer face of said body a shaft support is screwed, comprising a base from which the tip of said shaft is projected; said support is attached to the tube through screws and defines a housing of an external end of said shaft.

11. The mechanically-operated hand-held forcible entry device of claim 1, wherein said platform is moved on said screw back and forward depending on the turning direction of said screw, and the operating face of said platform includes four cylindrical recesses on each of which the internal columns are mounted, and the internal columns are made of steel.

12. The mechanically-operated hand-held forcible entry device of claim 11, wherein the tips of said four columns pass through holes of the small wedge plate and rest on four recesses of a large wedge plate.

13. The mechanically-operated hand-held forcible entry device of claim 12, wherein said small wedge plate includes a wedge-like foot attachment that is complemented with the large wedge plate that includes an opening which shapes coincides with the shape of said attachment.

14. The mechanically-operated hand-held forcible entry device of claim 1, wherein the handle comprises an expandable telescopic handle including an external cylindrical bar and an internal cylindrical bar, the external end of said internal bar is inserted into a U-shaped recess of an intermediate piece.

15. The mechanically-operated hand-held forcible entry device, of claim 14, wherein said intermediate piece also includes a central recess in which an end of a ratchet is inserted.

16. The mechanically-operated hand-held forcible entry device of claim 15, wherein said ratchet is made of chrome-vanadium steel and can be operated as a crank in circular rotation using a unique 90° snap-out crank handle.

17. The mechanically-operated hand-held forcible entry device of claim 15, wherein said ratchet is locked into place using a spring loaded ball lock, which thus becomes a carry handle as well as positioning the unit ready for operating.

18. The mechanically-operated hand-held forcible entry device of claim 15, wherein said ratchet incorporates a flip-out design of 90° crank handle device.

19. The mechanically-operated hand-held forcible entry device of claim 18, wherein said ratchet includes the internal ratchet mechanism itself, including a pawl, a ratchet wheel and a shaft.

20. The mechanically-operated hand-held forcible entry device of claim 19, wherein said drive shaft includes a faceted external projection which in turn is inserted in a complementary recess of a cylindrical adapter piece.

* * * * *